United States Patent
Marupaduga et al.

(10) Patent No.: US 10,804,981 B1
(45) Date of Patent: Oct. 13, 2020

(54) DYNAMIC DETERMINATION OF ANTENNA ARRAY MODE

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/553,378

(22) Filed: Aug. 28, 2019

(51) Int. Cl.
  *H04B 7/04* (2017.01)
  *H04B 7/0452* (2017.01)
  *H04B 7/08* (2006.01)
  *H04B 7/06* (2006.01)

(52) U.S. Cl.
  CPC ......... *H04B 7/0452* (2013.01); *H04B 7/0691* (2013.01); *H04B 7/0874* (2013.01)

(58) Field of Classification Search
  CPC ... H04W 52/325; H04W 88/08; H04W 64/00; H04W 72/046; H04W 48/12; H04W 52/08; H04W 52/283; H04W 84/045; H04W 4/029; H04W 4/08; H04W 28/0268; H04W 72/0486; H04W 72/12; H04W 52/46; H04W 72/085; H04B 7/0617; H04B 7/0408; H04B 7/0491; H04B 7/0452; H04B 7/0413; H04B 7/0891; H04B 7/0697; H04B 7/2606; H04B 7/0874; H04B 7/0695; H01Q 21/065; H01Q 3/24; H01Q 3/267; H01Q 21/0018; H01Q 21/24; H01Q 1/246; H01Q 3/267; Y02D 70/00; Y02D 70/1242; Y02D 70/1262; H04M 2250/10
  See application file for complete search history.

(56) References Cited

U.S. PATENT DOCUMENTS 6,584,330 B1 * 6/2003 Ruuska ............. H04W 52/0206 455/574

* cited by examiner

*Primary Examiner* — Rahel Guarino

(57) ABSTRACT

Systems and methods are provided for dynamically determining antenna array mode assignment for transmission of downlink power to one or more wireless communication devices (WCD). The system comprises an access point that is configured to transmit wireless downlink signals to a WCD using a first communication protocol and a second communication protocol. A processor collects data over a predetermined time period, which may include sector load data and WCD location data. Then, the processor analyzes the data collected and based on such analysis, determines the antenna array mode assignment. In some aspects, the processor also determines whether there is MU-MIMO grouping between two or more WCDs.

20 Claims, 7 Drawing Sheets

DYNAMIC DETERMINATION OF ANTENNA ARRAY MODE

TECHNICAL FIELD

The present invention relates to the dynamic determination of antenna array mode assignments, substantially as shown in and/or described in connection with at least one of the figures, and as set forth more completely in the claims.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, antenna array mode assignments are determined based on a variety of factors, including user or wireless communication device (WCD) location and sector loading. Currently, wireless communication networks utilize a variety of different types of antenna arrays to transmit downlink power to WCDs. In many instances, the antenna array utilized may be configured such that there are two portions on the antenna array—a left and a right portion. Each portion may be identical to one another and comprise the same number of rows and columns of subarrays or antenna elements. For example, a left to right configuration of an antenna array may be configured to include 4 rows and 4 columns on both the left portion and right portion. In such configurations, one side may be comprised of 4G nodes while the other side may be comprised of 5G nodes. While the left to right antenna array mode configuration is frequently used, it has limitations when there is unequal traffic in the horizontal and vertical plane, as the left to right configuration is unable to variate beamforming in the horizontal plane. As such, when there are more WCDs on a certain plane (e.g. 40 WCDs in the horizontal plane and 60 WCDs in the vertical plane), the left to right configuration is unable to adjust the beam in the horizontal plane, resulting in decreased signal quality, decreased sector throughput, and decreased sector efficiency.

The present system addresses this problem by dynamically determining the antenna array mode assignment for a transmission of downlink power to one or more WCDs based on the WCD location, sector loading, and MU-MIMO grouping. The present system, based on these factors, may dynamically determine that another antenna array mode configuration, such as a top to bottom configuration, will provide better sector throughput, efficiency, and signal quality. As such, the system may dynamically change a current antenna array mode configuration from a left to right configuration to a top to bottom configuration to provide improved signal quality and sector throughput. A top to bottom antenna array configuration, in which the antenna array is split into a top portion and a bottom portion that are identical to one another (e.g. 4 rows and 8 columns of subarrays in both the top and bottom portion) allows for variation in the beamforming. This configuration comprising more columns of subarrays and more elements in the vertical plane allows for narrower, more targeted beamforming, which results in improved signal quality and better throughput in situations where the number of WCDs are unequal in the horizontals and vertical plane. As a result, the performance of the signals between an access point and a WCD on a high data performance or loaded network is improved.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
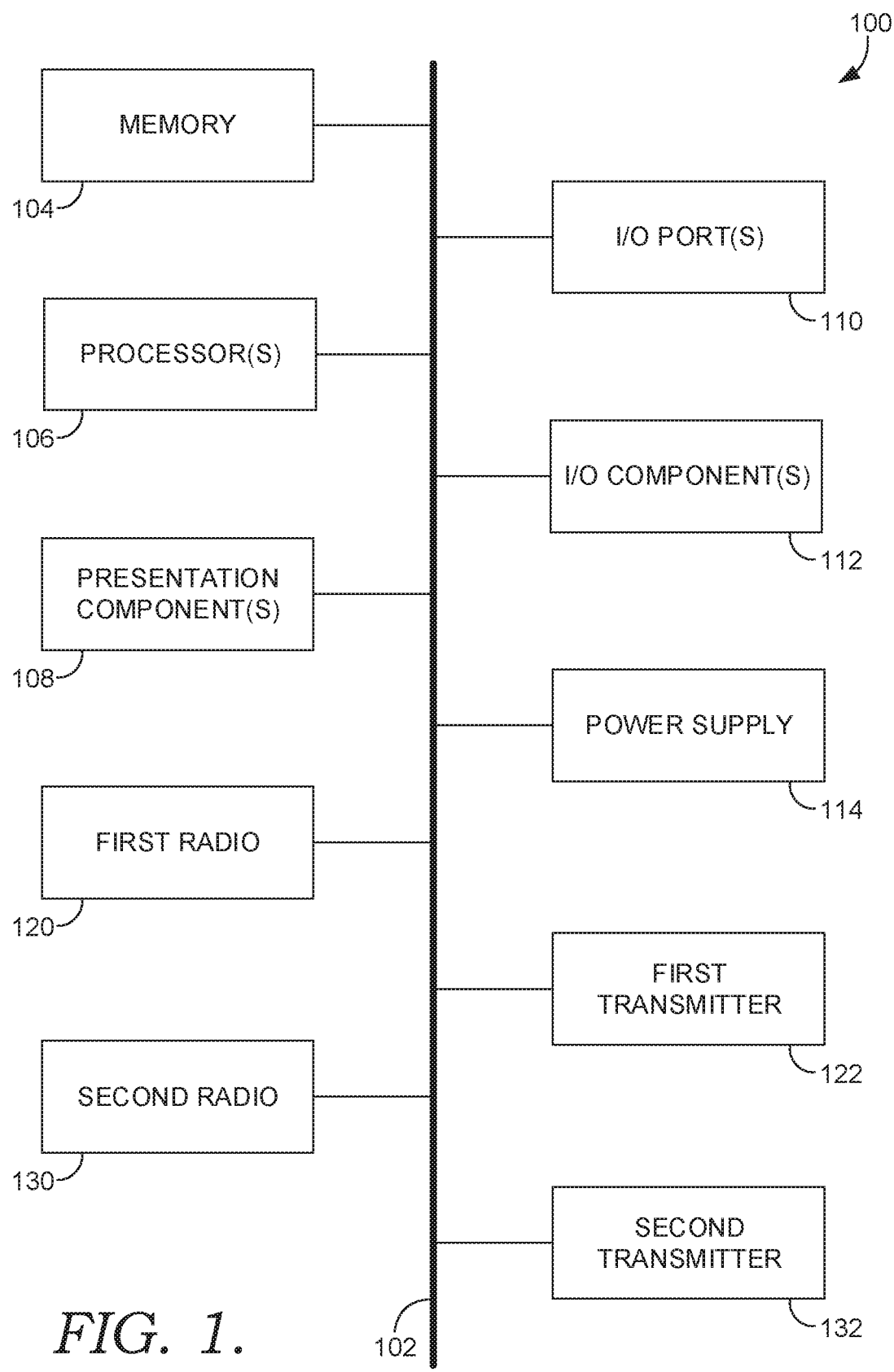
FIG. 1 depicts a diagram of an exemplary computing environment suitable for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to WCDs of the telecommunications network. An access point may be considered to be a portion of a base station that may comprise an antenna, a radio, and/or a controller. In aspects, an access point is defined by its ability to communicate with a user equipment (UE), such as a WCD, according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, frequency of the transmission, among other factors.

As used herein, WCDs that are spatially distributed with respect to an access point may be said to be in different locations relative to the access point. Such distance-related terminology may be read to mean a distance at ground level between the ground level of the access point and the ground level of the device, it may refer to the distance actually traveled by the signal (in aspects, affected by multipath, reflection, etc.), and/or it may refer to a signal strength (e.g., a first device is further from an access point than a second device based on the downlink signal received at the first device being weaker than the downlink signal received at the second device).

A UE or a WCD can include any device employed by an end-user to communicate with a wireless telecommunications network. A WCD can include a mobile device, a mobile broadband adapter, or any other communications device employed to communicate with the wireless telecommunications network. A WCD, as one of ordinary skill in the art may appreciate, generally includes one or more antenna coupled to a radio for exchanging (e.g., transmitting and receiving) transmissions with a nearby base station.

Generally speaking, many modem WCDs comprise at least two transmitters. In some configurations, a WCD may operate using dual connectivity. That is, the WCD may use at least a first of its transmitters to communicate a first uplink signal to a first node at an access point and at least a second of its transmitters to communicate a second uplink signal to a second node at the access point. In other configurations, a WCD may operate using single connectivity, wherein it uses one or more of its transmitters to communicate with a single access point, base station, or cell site at one or more nodes. Whether using dual connectivity or single connectivity, a WCD may have a pre-set maximum total uplink power (as will be discussed in greater detail below). Conventionally, a communication session between a WCD and an access point comprises an uplink handshake, wherein the uplink handshake is an uplink signal from the WCD to an access point, conventionally transmitted at the pre-set maximum uplink power. Once the handshake occurs, the network and/or the device may determine that the uplink power may be reduced (e.g., if, based on proximity or line of sight, it is determined that only half of the maximum pre-set uplink power is necessary to effectively propagate the uplink signal to the access point). The opposite, WCD may not increase the power of the transmission (it may retry again later or attempt to connect to a different access point, for example).

Further, as communication protocols rapidly evolve from 3G, to 4G/LTE, to 5G, it is conceived that a WCD may benefit from connecting to more than one node using more than one protocol. For example, a 5G communication session may have a higher throughput, used for a data session, and a 4G communication session may have characteristics that make it more suitable for a voice session. Thus, it may be desirable for the WCD to be simultaneously connected to more than one protocol.

Generally, conventional antennas may either have a fixed beam pattern or may only be capable of dynamically varying the horizontal radiation pattern of a beamform. In a fixed pattern antenna, the antenna beam patterns are fixed once the antenna is installed at a base station. While the direction of a beam can be modified manually or with antenna motors, the transmission beam emitted by the antenna is generally of a fixed shape and distance. Some antennas, or antenna arrays, are capable of dynamically varying the horizontal radiation pattern of a beamform. For example, a conventional cell site may comprise two or more columns of antennas, each column having its own power supply. By adjusting the power supply to one or more columns, the horizontal radiation pattern of the beamform may be adjusted—but not the vertical radiation pattern. A full dimension multiple input multiple output (MU-MIMO) antenna (also known as Massive MIMO, or active antenna array), on the other hand, can generate a more focused beam that is directed to one or more devices within a general vicinity of the antenna. A MU-MIMO base station can include multiple antennas and transmitters that broadcast, transmit and receive transmissions. With MU-MIMO technology, a base station can form a beam in both horizontal and vertical directions so that the transmission of a signal can be more focused and directed to a particular area and location within its transmission range. MU-MIMO antennas were created to support environments where multiple WCDs are trying to access a wireless network at the same time. For example, multiple WCDs within an office building may be trying to access the same wireless network throughout a business day. When multiple WCDs begin accessing the router at or near the same time, congestion can be introduced as the router services the first WCD's request while the second (and third, fourth, etc.) wait. While these times can be miniscule, it can add up with more devices (smartphones, tablets, computers, etc.) and WCDs asking for resources. MU-MIMO helps this by allowing for multiple WCDs to access router functions without the congestion.

Beamforming is conventionally employed to provide a directional data transmission to a specific WCD, so that data on a traffic channel or data plane can be sent to that specific WCD. However, beamforming has typically been employed to provide data to that specific user device and not to a group of WCDs located within a given sector. Moreover, beamforming has either been done via actuators that change the physical orientation of an antenna (or antenna array), or when done without physical means, only horizontally beamformed. Being able to provide a system for varying power supplies to dynamically modify the 3D beamform of an antenna array provides a variety of technical benefits, including benefits for WCD users. On the network side, more network efficiencies are realized when the beam emitted from an antenna is capturing the most WCDs, and on the flip side, those WCDs are provided with a better overall experience.

The present disclosure is directed to systems, methods, and computer readable media that provide an improvement over conventional antenna array mode assignments for transmission of downlink power to one or more WCDs. In accordance with aspects described herein, data is collected over a predetermined time period and analyzed to determine a sector load and a location of one or more WCDs, which is then used to dynamically determine an antenna array mode assignment. Being able to dynamically determine an antenna array mode assignment for the transmission of the downlink power to one or more WCDs based on the WCD location, sector loading, and potential MU-MIMO grouping allows for better signal quality and increased sector throughput. It also results in increased sector efficiency because less resources are used over a single time period. By analyzing the data collected, the system is able to determine the appropriate antenna array mode assignment so that the signal quality and throughput is optimal. In circumstances where the sector load is low or the traffic is equal in the horizontal and vertical planes, a left to right configuration of the antenna array may be the appropriate choice for the best signal quality and throughput. However, when the traffic in the horizontal and vertical planes are uneven (e.g. 30 WCDs in the horizontal plane and 15 WCDs in the vertical plane) or when a MU-MIMO grouping is unequal (e.g. grouping of 3 WCDs in the vertical plane and 5 WCDs in the horizontal plane), a top to bottom configuration of the antenna array may produce a better signal and through put as the top to bottom configuration will allow for a more narrow horizontal beam width.

Accordingly, a first aspect of the present disclosure is directed to a system for dynamically determining antenna array mode assignment for transmission of downlink power to one or more WCDs, the system comprising an access point having an antenna array configured to transmit wireless downlink signals to one or more WCDs using a first communication protocol and a second communication protocol. The system further comprises a processor that is configured to collect data over a predetermined period of time and then analyze the data to determine a sector load and a location of one or more WCDs within a sector. Based on this analysis, the system then dynamically determines an antenna array mode assignment. The antenna array mode assignment may be a left to right configuration or a top to bottom configuration.

A second aspect of the present disclosure is directed to a method for dynamically determining antenna array mode assignment for transmission of downlink power to one or more WCDs. The method comprises collecting a first set of data over a predetermined time period, analyzing the first set of data to determine a sector load, collecting a second set of data over a predetermined time period, analyzing the second set of data to determine a location of one or more WCDs within a sector, and based on the sector load and the location of the WCDs within the sector, dynamically determining an antenna array mode assignment.

Another aspect of the present disclosure is directed to another system for determining antenna array mode assignment for transmission of downlink power to one or more WCDs. In this aspect, the system comprises an access point configured to transmit wireless downlink signals to the WCD using a first communication protocol and a second communication protocol and a processor. The processor is configured to perform operations comprising collecting data over a predetermined time period, analyzing the data to determine a sector load and a location of one or more WCDs within a sector, determining that there is a MU-MIMO grouping between two or more WCDs present, and based on the sector load, the location of the one or more WCDs within the sector, and the MU-MIMO grouping between two or more WCDs, and dynamically determining an antenna array mode assignment.

Turning first to FIG. 1, a diagram is depicted of an exemplary computing environment suitable for use in implementations of the present disclosure. In particular, the exemplary computer environment is shown and designated generally as computing device 100. Computing device 100) is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE/WCD, or other WCD, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes a bus 102 that directly or indirectly couples the following devices: memory 104, one or more processors 106, one or more presentation components 108, input/output (I/O) ports 110, I/O components 112, power supply 114, first radio 120, second radio 130, first transmitter 122 and second transmitter 132. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with a wireless telecommunications network. In aspects, the first radio 120 utilizes a first transmitter 122 to communicate with the wireless telecommunications network and the second radio 130 utilizes the second transmitter 132 to communicate with the wireless telecommunications network. Though two radios are shown, it is expressly conceived that a computing device with a single radio (i.e., the first radio 120 or the second radio 130) could facilitate communication with the wireless telecommunications network via both the first transmitter 122 and the second transmitter 132. Illustrative wireless telecommunications technologies include CDMA, GPRS, TDMA, GSM, and the like. One or both of the first radio 120 and the second radio 130 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
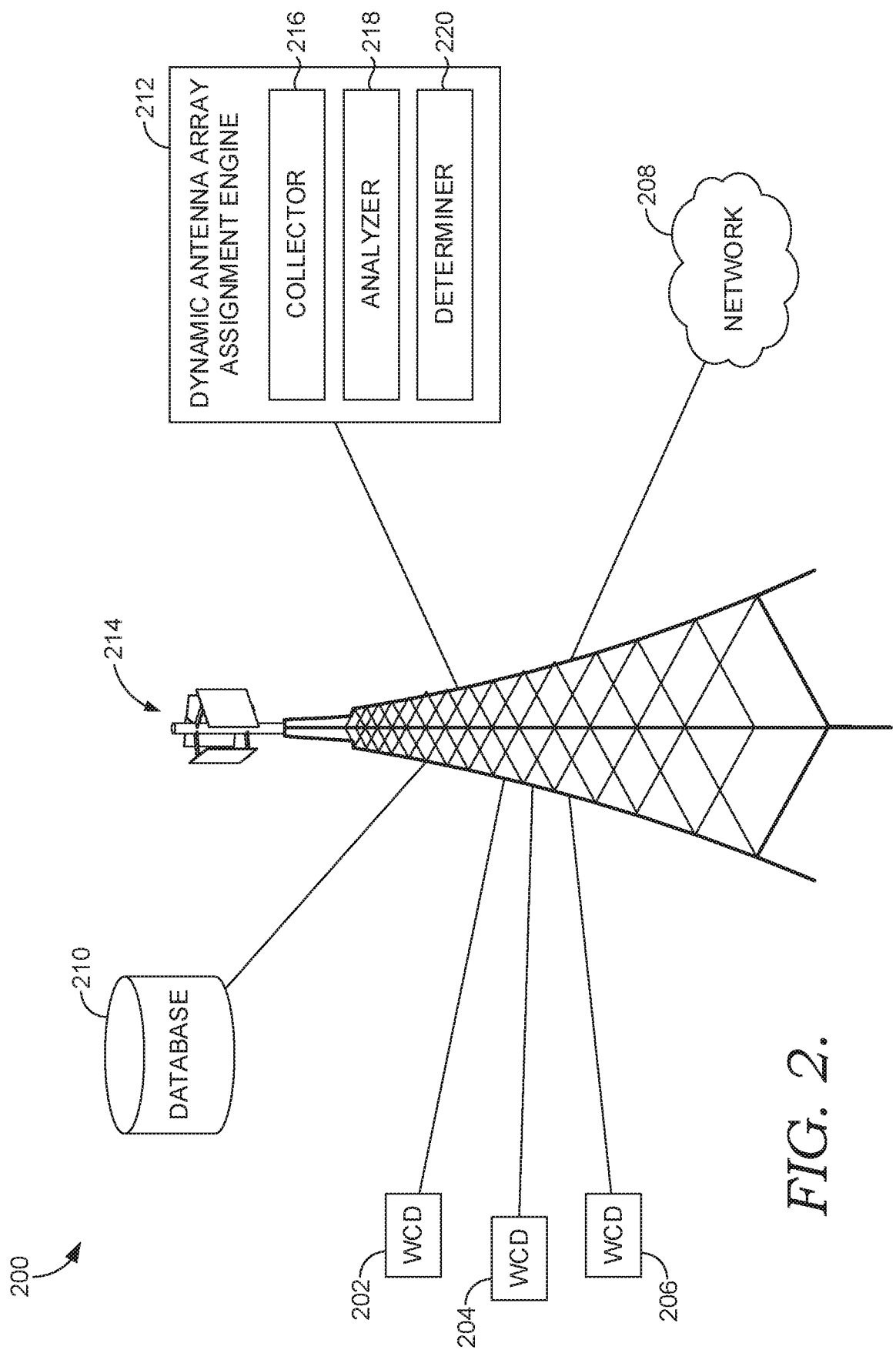
FIG. 2 illustrates a diagram of an exemplary network environment in which implementations of the present disclosure may be employed, in accordance with aspects herein.

Next, FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes WCDs (items 202, 204, and 206), access point 214 (which may be a cell site, base station, or the like), network 208, database 210, and dynamic antenna array assignment engine 212. In network environment 200, WCDs may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the WCDs (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a WCD (items 202, 204, and 206) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the WCDs (items 202, 204, and 206) in network environment 200 can optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to WCDs, such as WCDs 202, 204, and 206. For example, network 208 may provide voice, SMS, and/or data services to WCDs or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with user devices, such as WCDs 202, 204, and 206 that are located within the geographical area, or cell, covered by radio antennas of cell site 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the WCDs using dynamic beamforming. Additionally, the access point 214 comprises an antenna array configured to transmit wireless downlink signals to one or more WCDs using a first communication protocol and a second communication protocol. In some aspects, the first communication protocol is a 4G network technology and the second communication network is a 5G network technology. In other aspects, the second communication protocol is a 5G network technology. In yet other aspects, the first and second protocols may both be a 4G or 5G network technology or any other network technology which allows an antenna array on the access point 214 to transmit wireless downlink signals to one or more WCDs. Additionally, the access point 214 may communicate with the WCD using an eNodeB or a gNodeB.

As shown, access point 214 is in communication with dynamic antenna array assignment engine 212, which comprises various components that are utilized, in various implementations, to perform one or more methods for dynamically determining antenna array mode assignment for transmission of downlink power to one or more WCDs. In some implementations, dynamic antenna array assignment engine 212 comprises components including a collector 216, an analyzer 218, and a determiner 220. However, in other implementations, more or less components than those shown in FIG. 2 may be utilized to carry out aspects of the invention described herein.

The collector of 216 of the dynamic antenna array assignment engine 212 is generally responsible for collecting data over a predetermined time period for the determination of the antenna array mode assignment. The data collected by the collector 216 may comprise sector loading data and WCD location data. Sector loading data indicates how heavily loaded the sector is by indicating how many WCDs are active within the given sector. Additionally, sector load day may include data about the types of WCDs present within the given sector. For example, sector load data may indicate that there are 100 WCDs present within the sector and that the majority of the WCDs are either high data performance, guaranteed bit rate user (GBR), or MU-MIMO WCDs. A GBR user is a user who has a guaranteed bit rate and are not necessarily impacted by congestion on a network. WCD location data comprises information about where each of the one or more WCDs within a sector is located and indicates whether there is an equal or unequal distribution of WCDs in the horizontal and vertical planes within the sector.

In further aspects, the collector 216 may also collect data regarding whether there are any MU-MIMO groupings occurring between two or more WCDs. MU-MIMO grouping occurs when there is a grouping of at least one WCD in a horizontal plane and at least one WCD in a vertical plane. MU-MIMO grouping occurs in an effort to share resources and increase sector throughput, thereby increasing sector efficiency. In some instances, the MU-MIMO grouping may comprise an even number of WCDs in the horizontal and vertical planes, while in other instances, the MU-MIMO pairing may have unequal WCDs in each plane. For example, a MU-MIMO grouping may comprise 6 WCDs in the horizontal plane and 6 WCDs in the vertical plane. In another instance, the MU-MIMO grouping may comprise 6 WCDs in the vertical plane and 2 WCDs in the horizontal plane. When there is unequal distribution of WCDs in MU-MIMO grouping, a top to bottom configuration of the antenna array mode may be more ideal for having a more optimal signal and better sector throughput. However, when the MU-MIMO pairing is equal (e.g. 4 WCDs in a horizontal plane and 4 WCDs in the vertical plane), the left to right configuration may produce the better signal quality and sector throughput.

Additionally, data sent from a WCD device to the access point 214 may comprise location information of the WCD and network parameters determined at or by the WCD that includes information on how good or bad the communication channel quality is (SINR, pathless, or the like) and the device power levels (maximum uplink powers and maximum total uplink power). Location information may be based on GPS or other satellite location services, terrestrial triangulation, an access point location, or any other means of obtaining coarse or fine location information. The data collected may also include signal to noise ratio for one or more transitory signals communicated between the WCD and each of the first communication protocol and second communication protocol. Network parameters may indicate a realized uplink and/or downlink transmission data rate, observed signal-to-interference-plus-noise ratio (SINR) and/or signal strength at the user device, path loss, or throughput of the connection. Location and/or network parameters may take into account the WCD capability, such as the number of antennas and the type of receiver used for detection. Additionally, the data may also comprise path loss between the WCD and each of the first communication protocol and the second communication protocol and sector interference in a predetermined geographical region or location. Further, the collector 216 may collect the data at predetermined time intervals throughout the day or continuously and any and all variations of collection intervals are contemplated herein.

The analyzer 218 is generally responsible for analyzing the data collected by the collector 216 for the determination of the antenna array mode assignment for the transmission of downlink power to the one or more WCDs within a sector. The analyzer 218 reviews the collected data, such as the location and sector load by the collector 216 for the determination of antenna array mode. The analyzer 218 is also generally responsible for determining network parameters and a plurality of uplink footprints emitted by each of the WCDs 202, 204, and 206. As used herein, the term uplink footprint may be considered to be synonymous with a radiation pattern of a WCD, such as WCD 202, 204, and 206 at a particular time. The uplink footprint may generally refer to the area in space in which the WCD 202, 204, and 206 emits a transitory signal having enough signal strength (dBm) to be effectively received and processed by an access point, such as access point 214, to sustain a wireless communication session. The analyzer 218 may compare the location of the WCD with respect to the access point 214, the path loss and the SINR of the downlink and/or uplink signals (among other network parameters) with the plurality of uplink footprints. In aspects, when multiple network parameters and/or location information is received from the same WCD, the analyzer may use an average, mean, median or any other statistical analysis to determine a single network parameter and/or location of a particular WCD.

The determiner 220 is generally responsible for determining an antenna array mode assignment based upon the analysis by the analyzer 218 of the sector load, location of the WCDs, and the potential MU-MIMO grouping. Based on the sector load and location of the WCDs, the determiner 220 may determine that the top to bottom antenna array mode configuration is the optimal antenna array mode assignment at the given moment. For example, if there are 40 WCDs in the horizontal plane and 20 WCDs in the vertical plane, the determiner 220 will determine that the top to bottom configuration will produce better signal quality and throughput since it will allow for variation of the horizontal beam width, thereby resulting in narrower horizontal beam width. In this case, the left to right configuration would not produce as optimal signal quality and throughput, since the left to right configuration is unable to produce variation in the horizontal plane. However, if there are 40 WCDs in the horizontal plane and 40 WCDs in the vertical plane, the determiner 220 may determine that the left to right configuration is optimal since there is an equal distribution of WCDs in the vertical and horizontal plane.

Once a determination of the antenna array mode assignment has been made, the system may repeat the process again over various predetermined time intervals or continuously throughout the day. For example, the collector 216 may be set to collect data every 4 hours or every 10 minutes. Similarly, the analyzer 216 and determiner 220 may also be set to complete their respect analysis and determinations at the same intervals as the collector 216. The number of times that the system repeats the determination of the antenna array mode assignment process may depend on how busy a sector is or the time of day (e.g. more collection of data at more frequent intervals during the work day in a sector comprising several business buildings).

It is also contemplated that the antenna array mode assignment may dynamically change throughout the day from the left to right configuration to the top to bottom configuration based on the data collected and analyzed and the determiner 220's determination. For example, at 7:00 AM, if a sector load is light and there are 5 WCDs present in a horizontal plane and 5 WCDs present in a vertical plane, the determiner 220 may analyze the sector load and WCD location data and determine that the left to right configuration is ideal and assign the left to right configuration. Then, during peak work hours (e.g. 9:00 AM-6:00 PM), the collector 216 may again collect sector load and WCD location data, which may indicate that there is heavy loading in the sector and that there are 50 WCDs in the horizontals plane and 80 WCDs in the vertical plane. As such, after the analysis of the data by the analyzer 218, the determiner 220 may determine that the top to right antenna array mode configuration is now ideal for the most efficient and high quality signal. As a result, the antenna array mode assignment may switch from the left to right configuration to the top to bottom configuration.

Figure 3:
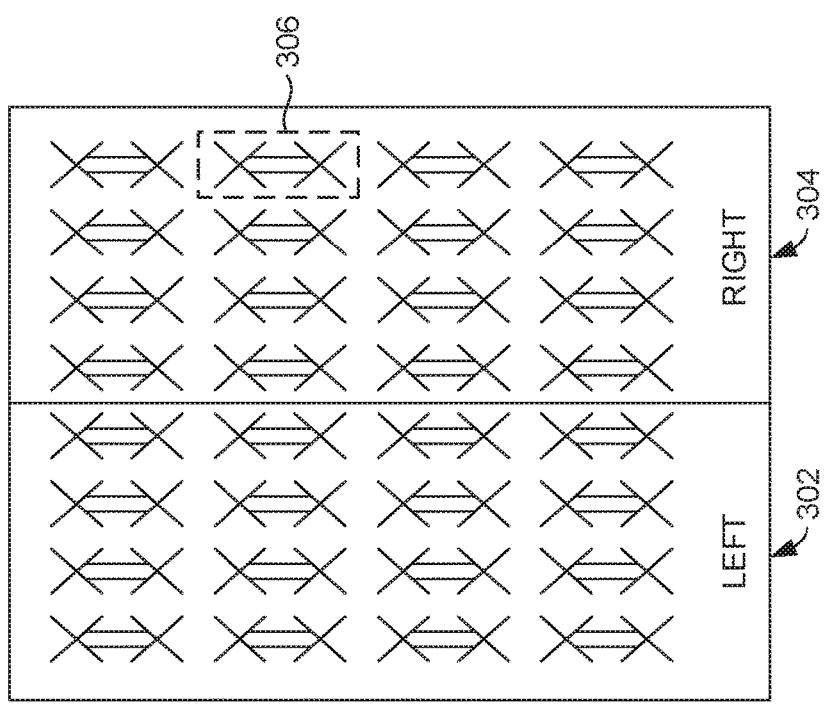
FIG. 3 depicts an exemplary left to right antenna array mode configuration, in accordance with aspects herein.

Next, FIG. 3 depicts an exemplary left to right configuration for an antenna array 300. The antenna array 300 may be an array comprised of a plurality of antenna elements or subarrays such as element 306. Each individual antenna element is capable of producing one narrow, directional beam. The antenna array 300 may be configured to produce analog beams, in some embodiments. The antenna array 300 may support multiple-input multiple-output (MIMO), multi-user multiple-input multiple-output (MU-MIMO), cooperative MIMO, and/or massive MIMO techniques and protocols, in various embodiments. In FIG. 3, the antenna array 300 may produce a plurality of beams (not shown). One or more of the plurality of beams may be associated with different directions at the access point 214 in embodiments. Each of the plurality of beams is transmitted in a different direction from the access point 214. The direction associated with each of the plurality of beams may be predefined or preset and each of the plurality of beams may be associated with a different direction, the plurality of beams may form a grid-like coverage area.

As shown, the antenna array 300 is split in half vertically, comprising a left portion 302 that mirrors the right portion 304 in terms of the number of columns, rows, and number of subarrays present. As shown, the left portion 302 of the array 300 comprises 4 rows of subarrays, such as subarray 306 and 4 columns of subarrays. The right portion 304 also comprises 4 rows of subarrays and 4 columns of subarrays. While FIG. 3 depicts both the left portion 302 and the right portion 304 as comprising 4 rows and 4 columns of subarrays, it is contemplated that any variation of the configuration is possible. For example, in other aspects, the left portion 302 may comprise 8 columns and 8 rows for a larger sized antennary array 300.

The left to right configuration of the antenna array 300 shown in FIG. 3 may be utilized in a variety of scenarios where there is equal amounts of traffic in the horizontal and vertical planes. As such, the left to right configuration forms equal beam positions for the horizontal and vertical planes. However, the left to right configuration does not allow for variation of service beams horizontally. Therefore, when there are unequal numbers of WCDs on a certain plane, such as the vertical plane, the left to right configuration is unable to variate the beam to accommodate the unequal WCDs. For example if there are 40 WCDs in both the horizontal and vertical plane, the left to right configuration is able to generate beams that can provide good signal quality and throughput. However, if there are 40 WCDs in the vertical plane and 20 WCDs in the horizontal plane, the left to right configuration is unable to compensate for the variation and does not produce as optimal beam as other configurations may.

Figure 4:
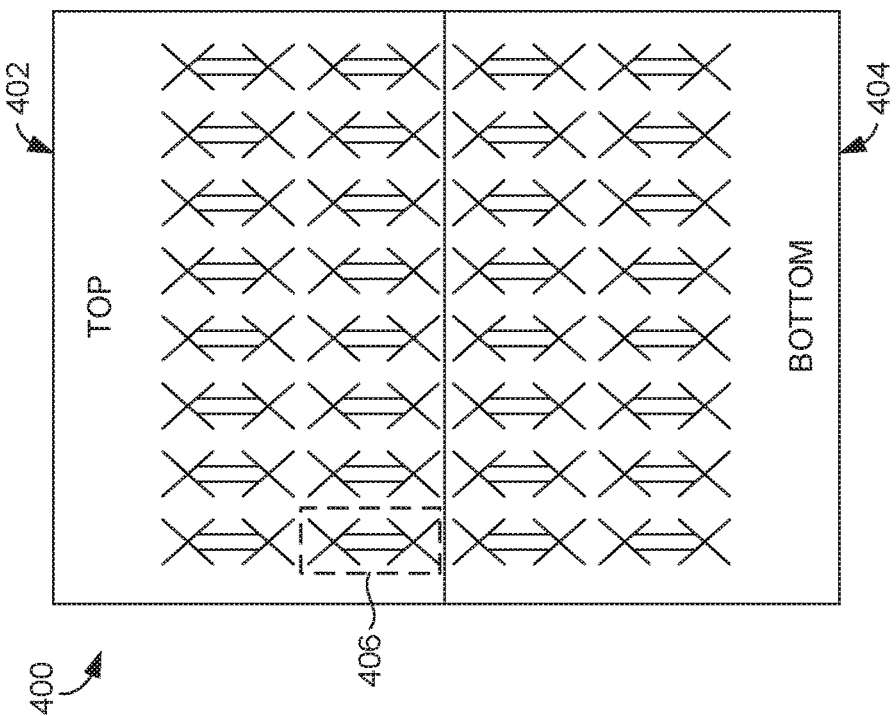
FIG. 4 depicts an exemplary top to bottom antenna array mode configuration, in accordance with aspects herein.

Next, FIG. 4 depicts an exemplary top to bottom configuration for antenna array 400. As shown, antenna array 400 comprises a top portion 402 and a bottom portion 404. Each of the top portion 402 and bottom portion 404 are comprised of two rows and 8 columns of subarrays 406. While the configuration shown in FIG. 4 depicts 2 rows and 8 columns of subarrays 406, it is contemplated that in other aspects, the top and bottom portions may each comprise different variations of columns and rows of subarrays within antenna array 400. As previously mentioned, an advantage of the top to bottom configuration of antenna array 400 is that it allows for variation of horizontal beams. Additionally, the 8 column configuration shown in FIG. 4 also provides for more narrow beams than in the 4 column configuration shown in the left to right configuration of FIG. 3. Further, the arrangement of the subarrays 406 in both the top portion 402 and bottom portion 404 allow for the creation of a wider angle on one plane while having a more narrow angle on the other plane.

Figure 5:
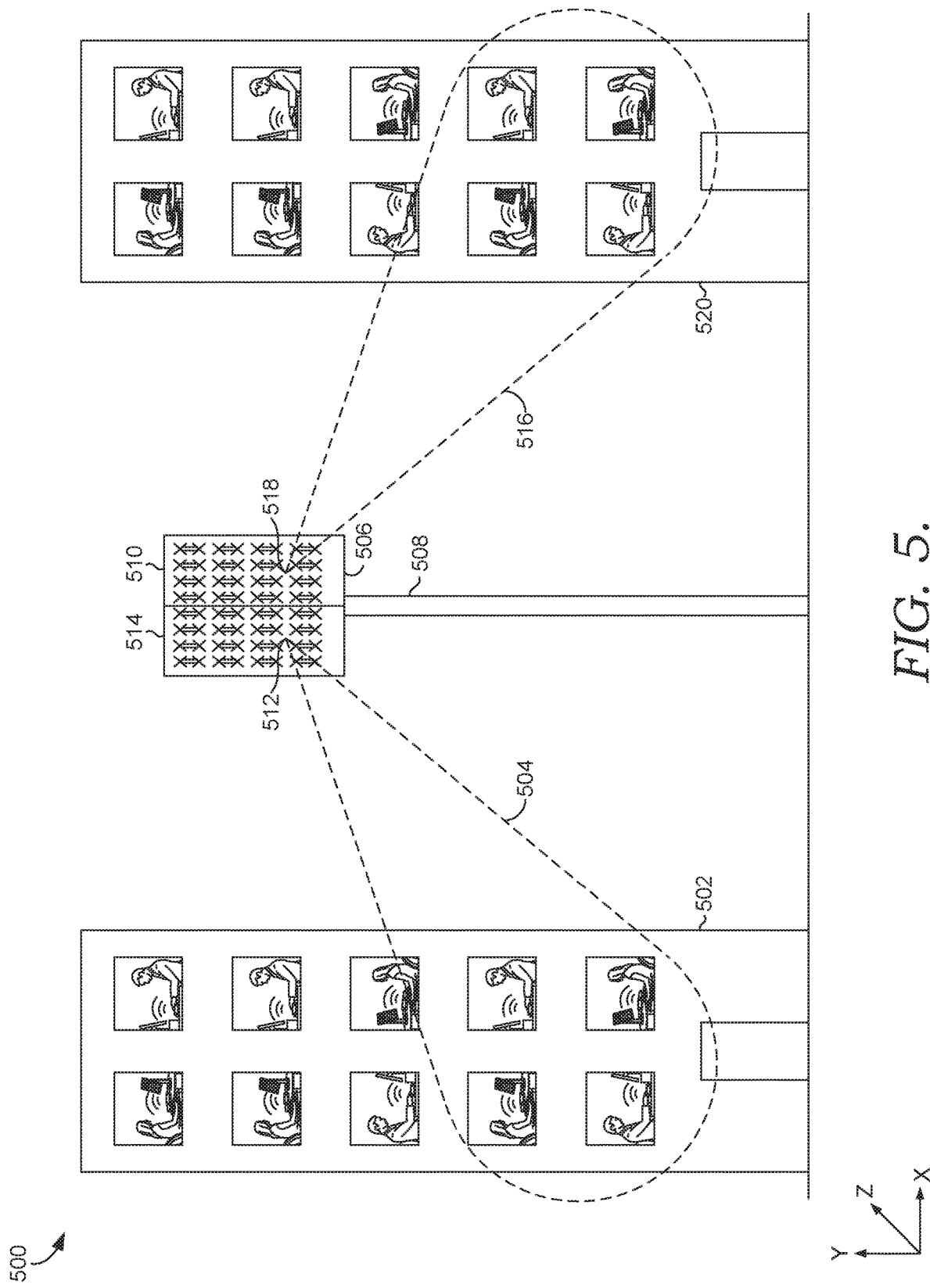
FIG. 5 depicts an exemplary representation of a left to right antenna array mode configuration in use, in accordance with aspects herein.

FIG. 5 depicts a representation of when the system 500 is utilizing the left to right antenna mode configuration. As shown, the system 500 comprises access site 508 comprising antenna array 506. The antenna array 506 comprises a left portion 514 and a right portion 510. Both the left and right portions 514 and 510 are identical, comprising 4 rows and 4 columns of subarrays. FIG. 5 also includes two office buildings 502 and 520, comprising multiple WCDs. As shown, both buildings comprise an equal number of WCDs in both the horizontal and vertical planes. In this example, there are 10 active WCDs in each building 502 and 520. The left portion 514 of the antenna array 506 has generated an exemplary beam 504 originating from location 512 for transmission of the downlink power to one or more of the WCDs in building 502. Similarly, the right portion 510 has generated an exemplary beam 516 originating from location 518 on the right portion 510 for transmission of downlink power to one or more of the WCDs in building 502.

In FIG. 5, the system 200's collector 216 has collected data over a predetermined period of time, the analyzer 218 has analyzed the data comprising WCD location and sector loading data, and the determiner 220 has determined, based on the sector load and WCD location, that the left to right configuration presents the most optimal antenna array assignment for signal quality and increased throughput. As shown, the beam 504 provides coverage for 4 WCDs within the building 502. Similarly, the right portion 510 of antenna array 506 has also generated a beam 516 originating from point 518 to provide coverage for 4 WCDs in building 520. Since there are an equal number of WCDs present in both the horizontal and vertical planes in both buildings 502 and 520, the determiner 220 has determined that the left to right antenna array mode configuration is ideal to have the best signal quality and sector throughput. Overall, the left to right antenna array mode provides better vertical plane capability while the top to bottom antenna array mode provides better horizontal plane capabilities as the top to bottom configuration allows for narrower beams and variation along the horizontal plane, while the left to right configuration does not. Additionally, while FIG. 5 depicts one beam from the left portion 514 and one beam from the right portion 510, it contemplated that there may be multiple beams generated from each portion at the same time.

Figure 6:
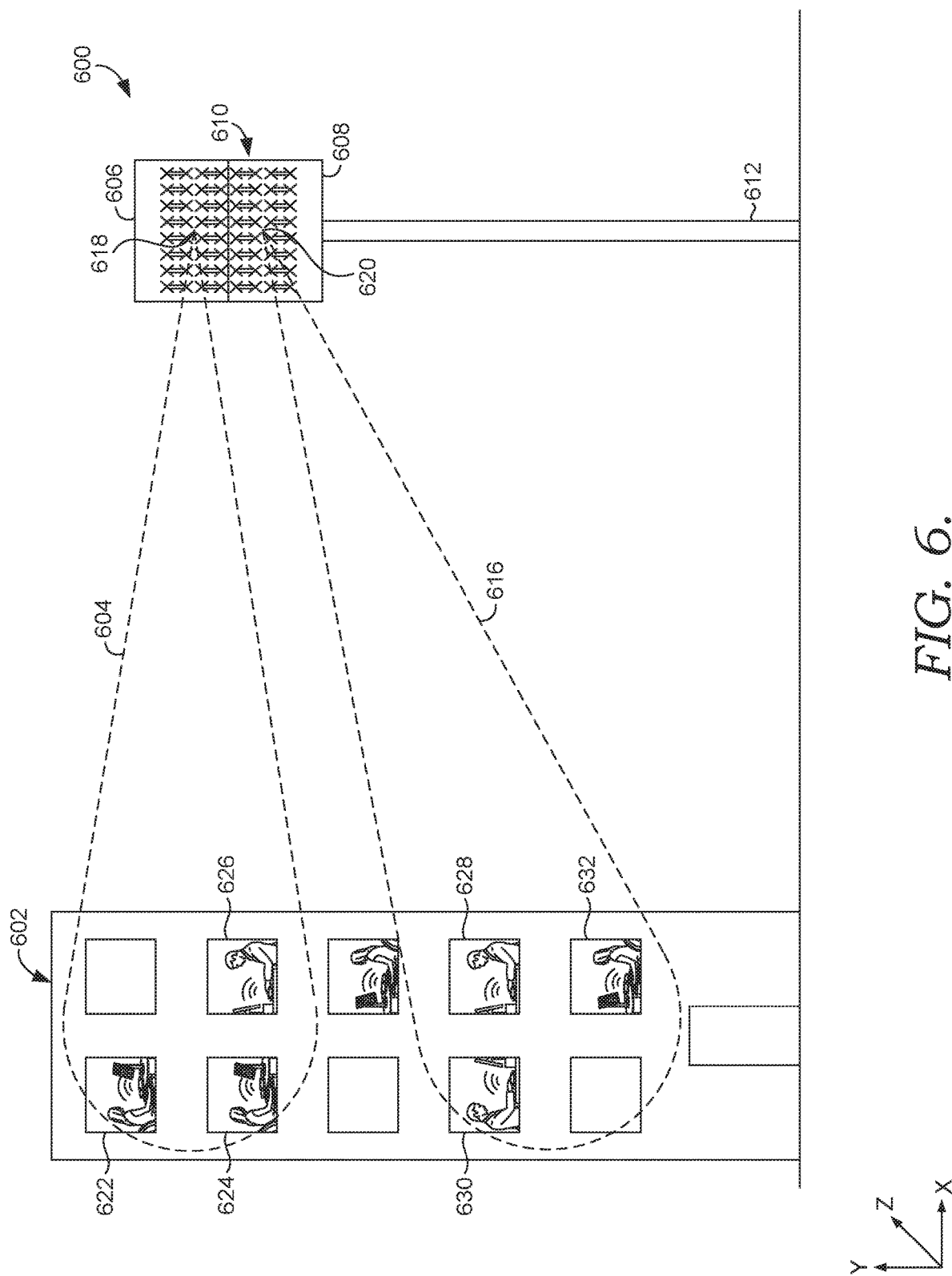
FIG. 6 depicts an exemplary representation of a top to bottom antenna array mode configuration in use, in accordance with aspects herein.

By contrast, FIG. 6, illustrates a system 600 where the top to bottom antenna array mode configuration has been assigned. In FIG. 6, the system 600 comprises a building 602 and an access point 612. Access point 612 comprises an antenna array 610 that is configured in the top to bottom configuration with a top portion 606 and a bottom portion 608. As discussed in FIG. 4, the top portion 606 and bottom portion 608 are identical and each comprise 2 rows and 8 columns of subarrays. In FIG. 6, the collector 216 has collected data including sector load data and WCD location data and the analyzer 218 has analyzed such data. The determiner 218 may have also determined whether any MU-MIMO pairing is present. Subsequently, the determiner 220 determined that the antenna array mode assignment should be the top to bottom configuration of antenna array 610 based such analysis.

As seen in building 602, the building comprises 7 WCDs that are actively communicating with the access point 612. As shown, the number of WCDs in the horizontal and vertical planes are unequal and as such, the determiner 220 determined that a top to bottom antenna array mode configuration was the optimal choice for the antenna array mode assignment. As shown, the top portion 606 has generated a beam 604 from point 618 within the top portion 606. The beam has been generated to provide downlink power to WCDs 622, 624, and 626. The bottom portion 608 generated a second beam 616 that is providing downlink power to WCDs 628, 630 and 632. Since the number of WCDs in the horizontal plane and vertical plane are uneven in FIG. 7, utilizing a top to bottom antenna array configuration provides the ability to have narrower beams to so that the WCDs are covered and the signal quality is improved along with increased sector throughput. By contrast, if a left to right configuration was utilization for system 600, the beams formed would be unable to have variation in the horizontals plane to account for the unevenness in the horizontal and vertical planes. As such, the left to right antenna array mode configuration would not produce as good signal quality or sector throughput.

Figure 7:
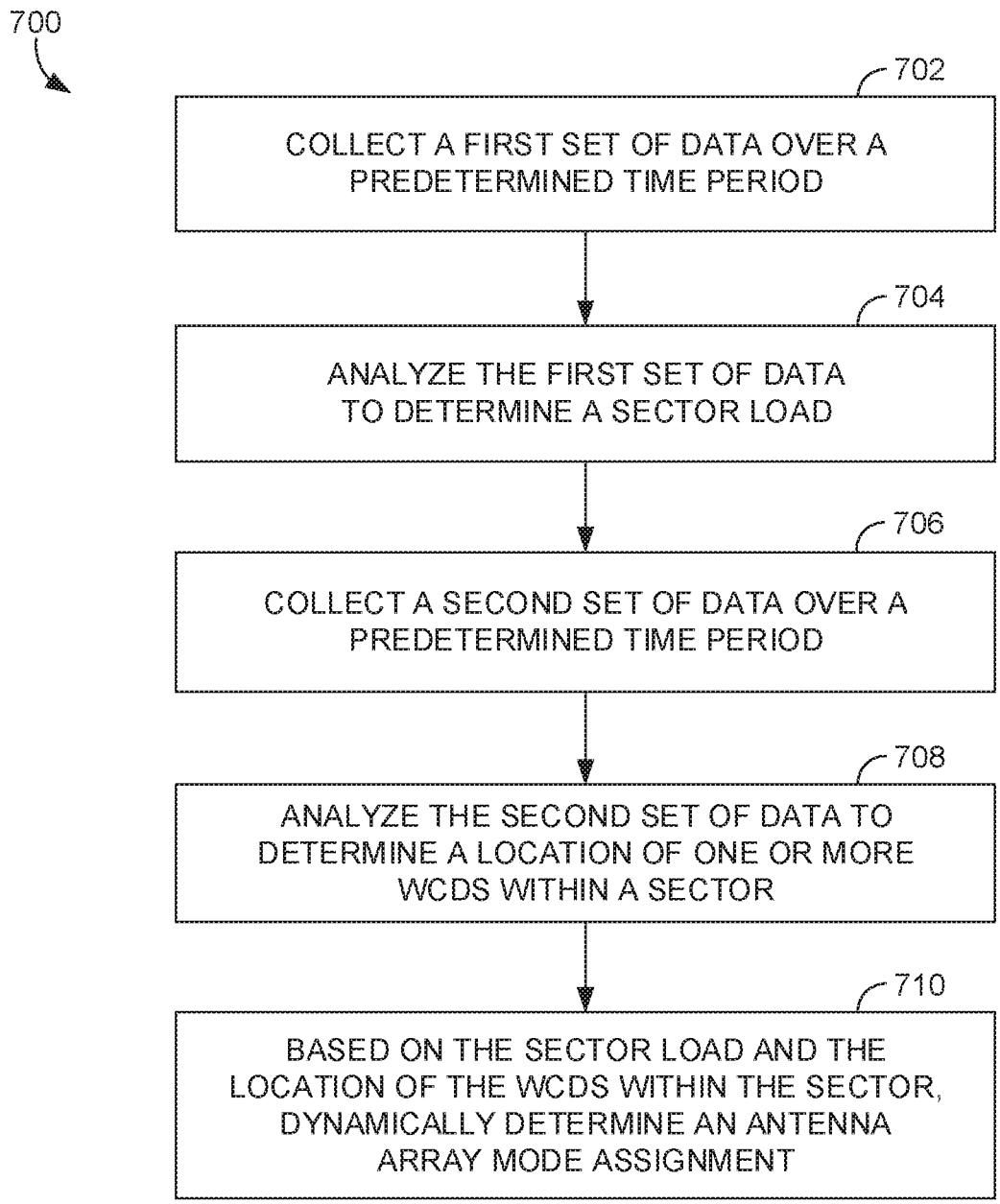
FIG. 7 depicts a flow diagram of an exemplary method for determining an antennary array mode assignment for transmission of downlink power to a WCD, in accordance with aspects herein.

FIG. 7 depicts a flow diagram of an exemplary method 700 for determining an antennary array mode assignment for transmission of downlink power to a WCD, in accordance with aspects herein. Beginning with block 702, the collector 216 collects a first set of data over a predetermined time period. The first set of data collected over the predetermined time period by the collector 216 is then analyzed by the analyzer 218 to determine a sector load at block 704. Then, at block 706, a second set of data is collected by the collector 216 over a predetermined time period. The analyzer 218 then analyzes the second set of data to determine a location of one or more WCDs within a sector at block 708. The predetermined time period may be any amount of time the system 200 allocates for collecting the first and second sets of data. For example, the predetermined time period may be seconds, hours, or days. In some aspects, the system 200 may collect and analyze the first and second sets of data multiple times throughout the day in order to account for changing sector load and WCD locations. For example, during peak work hours, the sector load data and WCD location data analyzed by analyzer 218 may indicate a sector that has heavy traffic and is putting significant demands on the system 200. Based on the sector load and the location of the WCDs within the sector, the system dynamically determines an antenna array mode assignment at block 710. Based on the analysis of the WCD locations and sector loading, the determiner 220 may determine that a left to right configured antenna array assignment is most optimal. In other circumstances the determiner 220 may determine that a top to bottom antenna array assignment is optimal.

Figure 8:
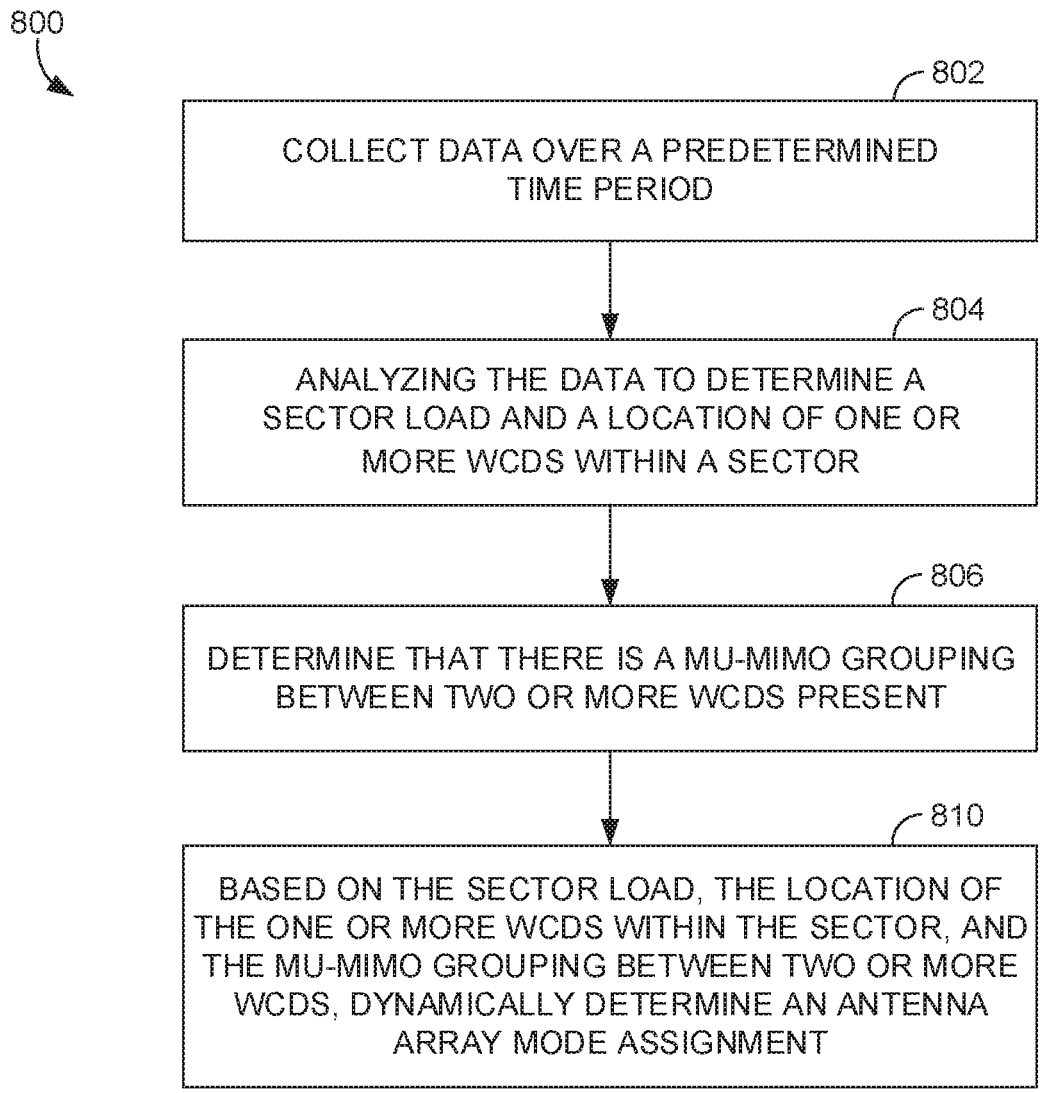
FIG. 8 depicts a flow diagram of another exemplary method for determining an antennary array mode assignment for transmission of downlink power to a WCD, in accordance with aspects herein.

FIG. 8 illustrates a flow diagram for another exemplary method 800 for dynamically determining antenna array mode assignment for transmission of downlink power to one or more WCDs. Beginning with block 802, the system 200, via the collector 216, collects data over a predetermined time period. As previously mentioned, the data collected over a predetermined time period by the collector 216 includes WCD location data and sector loading data. Once the data has been collected by the collector 216, the analyzer will analyze the data to determine a sector load and a location of one or more WCDs within a sector at block 804. Following this, the determiner 220 will determine whether there is a MU-MIMO grouping between two or more WCDs at block 806. Then, based on the sector load determination, location of one or more WCDs within the sector, and the MU-MIMO grouping between two more WCDs, the determiner 220 will also determine an antenna array mode assignment at block 810. The antenna array mode assignment may be a left to right configuration as shown in FIG. 3, a top to bottom configuration shown in FIG. 4, or any other suitable configuration.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamically determining antenna array mode assignment for transmission of downlink power to one or more wireless communication devices (WCD), the system comprising:
    an access point having an antenna array configured to transmit wireless downlink signals to one or more WCDs; and
    a processor, the processor configured to perform operations comprising:
    collecting data over a predetermined time period;
    analyzing the data to determine a sector load and a location of one or more WCDs within a sector of the access point; and
    based on the sector load and the location of the one or more WCDs within the sector, dynamically determining the antenna array mode assignment.

2. The system of claim 1, wherein the wireless downlink signals are transmitted via a 4G network technology.

3. The system of claim 1, wherein the wireless downlink signals are transmitted via a 5G network technology.

4. The system of claim 1, wherein the access point communicates with the WCD using an eNodeB.

5. The system of claim 1, wherein the access point communicates with the WCD using a gNodeB.

6. The system of claim 1, wherein the data collected comprises sector loading data.

7. The system of claim 1, wherein the data collected comprises WCD location data.

8. The system of claim 1, wherein the antenna array mode assignment comprises a left to right antenna array mode configuration.

9. The system of claim 8, wherein the antenna array mode assignment further comprises a top to bottom antenna array mode configuration.

10. The system of claim 9, wherein the system further determines that there has been a MU-MIMO grouping of two or more WCDs within the sector.

11. The system of claim 10, further wherein the MU-MIMO grouping comprises a pairing of at least one WCD in a horizontal plane and at least one WCD in a vertical plane.

12. The system of claim 11, further wherein when the MU-MIMO grouping comprises an equal number of WCDs in the horizontal plane and the vertical plane, the left to right antenna array mode configuration is assigned.

13. The system of claim 11, wherein when the MU-MIMO grouping comprises an unequal number of WCDs in the horizontal plane and the vertical plane, the top to bottom antenna array mode configuration is assigned.

14. The system of claim 13, wherein the top to bottom antenna array mode configuration produces a more narrow service beam than the left to right antenna array mode configuration.

15. A method for dynamically determining antenna array mode assignment for transmission of downlink power to one or more wireless communication devices (WCD), the method comprising:
    collecting a first set of data over a first predetermined time period;

analyzing the first set of data to determine a sector load;

collecting a second set of data over a second predetermined time period;

analyzing the second set of data to determine a location of one or more WCDs within a sector; and based on the sector load and the location of the WCDs within the sector, dynamically determining the antenna array mode assignment.

16. The method of claim 15, further comprising determining whether a MU-MIMO grouping of one or more WCDs has occurred.

17. The method of claim 16, further comprising determining whether the MU-MIMO grouping comprises an equal number of WCDs in a vertical plane and a horizontal plane.

18. The method of claim 17, further comprising determining a top to bottom antenna array configuration when the MU-MIMO grouping does not comprise the equal number of WCDs in a vertical plane and a horizontal plane.

19. A system for dynamically determining antenna array mode assignment for transmission of downlink power to one or more wireless communication devices (WCD), the system comprising:

an access point configured to transmit wireless downlink signals to the WCD; and a processor, the processor configured to perform operations comprising:

collecting data over a predetermined time period;

analyzing the data to determine a sector load and a location of one or more WCDs within a sector;

determining that there is a MU-MIMO grouping between two or more WCDs present; and based on the sector load, the location of the one or more WCDs within the sector, and the MU-MIMO grouping between two or more WCDs, dynamically determining the antenna array mode assignment.

20. The system of claim 19, wherein the antenna array mode assignment comprises one or more of a left to right configuration and a top to bottom configuration.

* * * * *